(12) United States Patent
Vigneaux et al.

(10) Patent No.: US 8,517,096 B2
(45) Date of Patent: Aug. 27, 2013

(54) METHODS AND APPARATUS FOR MEASURING RETURN FLOW IN A WELL

(75) Inventors: Pierre Vigneaux, Moisenay (FR);
Dominique Guillot, Fontenay aux Roses (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 358 days.

(21) Appl. No.: 12/936,995

(22) PCT Filed: Apr. 2, 2009

(86) PCT No.: PCT/EP2009/002398
§ 371 (c)(1),
(2), (4) Date: Dec. 14, 2010

(87) PCT Pub. No.: WO2009/127328
PCT Pub. Date: Oct. 22, 2009

(65) Prior Publication Data
US 2011/0094741 A1    Apr. 28, 2011

(30) Foreign Application Priority Data

Apr. 15, 2008    (EP) ..................................... 08290372

(51) Int. Cl.
*E21B 47/12*    (2012.01)
(52) U.S. Cl.
USPC ..................................... 166/253.1; 166/255.1

(58) Field of Classification Search
USPC ................. 175/50; 166/253.1, 255.1, 250.14
See application file for complete search history.

(56) References Cited

U.S. PATENT DOCUMENTS

| | | | |
|---|---|---|---|
| 6,634,425 B2 | 10/2003 | King et al. | |
| 8,305,228 B2 * | 11/2012 | Vigneaux | 340/854.6 |
| 2008/0128128 A1 * | 6/2008 | Vail et al. | 166/250.15 |
| 2008/0272931 A1 * | 11/2008 | Auzerais et al. | 340/854.7 |

FOREIGN PATENT DOCUMENTS

| | | |
|---|---|---|
| EP | 1854959 | 5/2006 |
| GB | 2119949 | 5/1982 |
| GB | 2349440 | 11/2000 |
| GB | 2393465 | 3/2004 |
| WO | 02059458 | 8/2008 |

* cited by examiner

*Primary Examiner* — William P Neuder
(74) *Attorney, Agent, or Firm* — Michael Dae

(57) ABSTRACT

An apparatus for use in a wellbore, made of a casing and an annulus with a fluid within, comprises a reel or wound optic fiber line fixed to an object within the casing, and a light transmitter/receiver device that is able to generate a signal through the optic fiber line and to measure a change of said signal. The optic fiber line is (a) on a first position fixed to a reference point linked to the light transmitter/receiver device, and is (b) on a second position unwound from the reel. The light transmitter/receiver device is able to measure the change of said signal when occurring at the second position, and the apparatus has a system able to measure the flow rate of the fluid exiting the annulus at the surface.

18 Claims, 1 Drawing Sheet

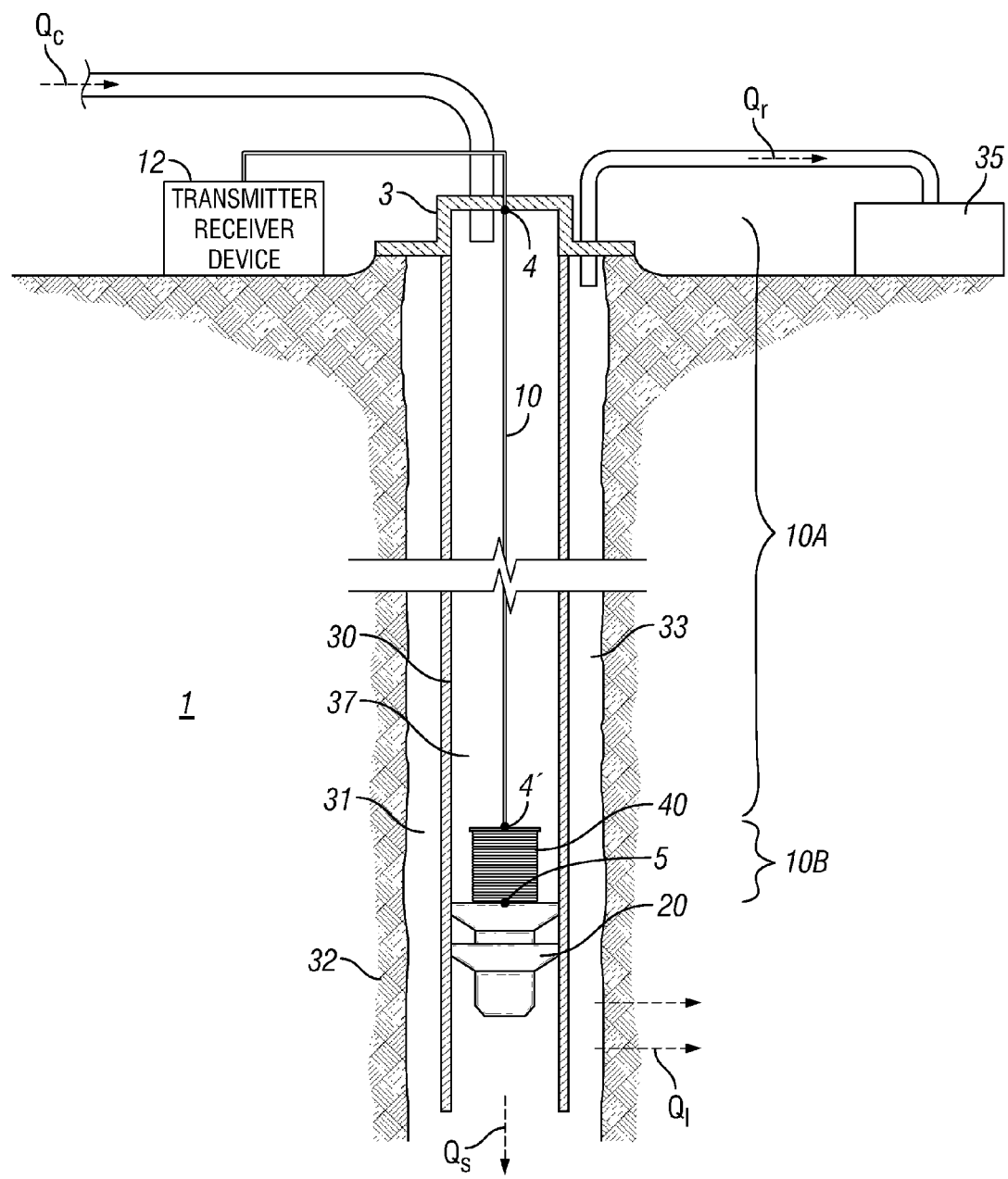

METHODS AND APPARATUS FOR MEASURING RETURN FLOW IN A WELL

FIELD OF THE INVENTION

The present invention generally relates to apparatus and methods for completing a well. Particularly, the present invention relates to apparatus and methods for locating a cement plug in the wellbore, measuring the return flow and estimating the leak of fluid into the formation.

DESCRIPTION OF THE PRIOR ART

After a well has been drilled, the conventional practice in the oil industry consists in lining the well with a metal casing. An annular area is thus formed between the casing and the formation. A cementing operation is then conducted in order to fill the annular area with cement. The combination of cement and casing strengthens the wellbore and facilitates the isolation of certain areas of the formation behind the casing for the production of hydrocarbons.

A major difficulty of the cement operation is the possible existence of a U-tubing phenomenon generated by the density difference between the mud filling the wellbore and the injected cement. The density of cement slurries is usually higher than those of the mud. When the cement slurry is introduced inside the casing, a hydrostatic pressure imbalance is created between the inside of the casing and the annulus. As a result, the cement slurry has a tendency to free-fall and draws a vacuum inside the upper part of the casing. In many cementing operations, the pump rate into the casing is insufficient to keep the casing full during the early part of the job. This results in a net flow or efflux of fluid from the well. The rate of efflux may be much greater than the inward flow. Eventually, as hydrostatic pressure equilibrium is approached, the outward flow falls below the inward flow and the casing gradually refills. At some point, the outward flow may reach zero and the fluid column in the annulus may become stationary. Such events are easily misinterpreted as partial or complete loss circulation. Finally, when the casing is again full of fluid, the inward and outward flow will be equal.

Prior art solutions to estimate the U-tubing effect involve the use of algorithms that permit fairly accurate simulations of these phenomena (Beirute, 1984; Wahlmeier and Lam, 1985). These algorithms have been validated against carefully measured field parameters during cementing operations (Kelessidis et al., 1994). Principal disadvantage of this solution is the need of powerful computers to achieve numerical simulation of the U-tubing effect in a reasonable speed.

Therefore, there is a need, for an easy apparatus and method to distinguish the U-tubing effect from partial or complete loss circulation.

SUMMARY OF THE INVENTION

According to one aspect of the invention, the invention provides an apparatus for use in a wellbore made of a casing and an annular with a fluid within, comprising: a reel of wound optic fiber line (or fiber) fixed to an object within the casing, and a light transmitter/receiver device able to generate a signal through the optic fiber line and to measure a change of said signal; wherein the optic fiber line is: (a) on a first position fixed to a reference point linked to the light transmitter/receiver device, and is (b) on a second position unwound from the reel; wherein the light transmitter/receiver device is able to measure the change of said signal when occurring at the second position; and the apparatus having a system able to measure the flow rate of the fluid exiting the annular at the surface level $Q_r$. The reel is directly fixed to the object or via a housing. The light transmitter/receiver is a transmitter/receiver not only limited to visible light, other electromagnetic radiations including ultraviolet radiations (near UV (380-200 nanometers wavelength); and/or far or vacuum UV (200-10 nanometers; FUV or VUV); and/or extreme UV (1-31 nanometers; EUV or XUV)) and infrared radiations (preferably: O-band 1260-1360 nanometers; and/or E-band 1360-1460 nanometers; and/or S-band 1460-1530 nanometers; and/or C-band 1530-1565 nanometers; and/or L-band 1565-1625 nanometers; and/or U-band 1625-1675 nanometers) are enclosed in the light transmitter/receiver. The reel is unwound under the movement of the object. Accordingly, the apparatus measures displacement of the object and can estimate the flow rate at the object level $Q_s$.

The apparatus can further comprise an input of fluid in the casing at the surface and a flow meter able to measure the flow rate of said fluid at the reference point level $Q_c$.

The light transmitter/receiver device is an apparatus able to measure the change of the signal at the second position. Effectively, there is no need to measure a change of the signal all along the optic fiber line; the only interesting change informing on the location or the displacement of the dynamic object is on the second position. The signal change can be made thanks to an optical event, as a modification of the morphology of the optic fiber line, more precisely a bend in the optic fiber line. There is way to enforce the optical event. Firstly, the reel can have a diameter of winding or a curvature on the reel short enough to create a bend at the second position producing the change of the signal at the second position. Secondly, an additional element can be added on the second position to create a bend at the second position producing also the change of the signal at the second position. All these advantageous embodiments ensure that the major optical event is located at the second position and is detected more precisely.

Preferably, the light transmitter/receiver device is an apparatus in the family of optical time domain reflectometer (OTDR). Effectively, the reflectometer will inject a short but intense light pulse into the optic fiber line from the first position and will measure the backscatter and reflection of light as a function of time. The bend created on the second position will ensure an attenuation which will be detected by the reflectometer. Preferably if needed to be cost effective, this light transmitter/receiver device is a fiber break locator (FBL), which is roughly a simplify reflectometer designed to only detect break along the fiber.

The apparatus of the invention applies to objects as a dart or a plug or a foam ball. The reel has a diameter between 20 and 50 millimeters, and preferably between 30 and 35 millimeters for a light pulse wavelength of 1310 or 1550 nanometers.

According to another aspect of the invention, the apparatus can be deployed with one or more sensors informing on property of the environment surrounding the sensor. Also, the optic fiber line is linked to a sensor located on the object. Effectively, because a fiber is already deployed between the surface and the object, a signal can be transmitted along the fiber from the surface to the sensor and from the sensor to the surface. This second embodiment is compatible with the location apparatus: for the location, the light transmitter/receiver device focuses only on the bend at the second position; for the sensor, the light transmitter/receiver device uses all the fiber to transmit and receive signal from the sensor. The object can have all types of sensor and associated electronic including power supply to measure physical parameters of the environment: temperature, pressure, pH, salinity, density, resistivity, or conductivity. For example, when the object is a plug, sensor can be an ultrasonic gauge for measuring the wait on cement time (WOC).

More preferably, the sensor is a sensor self supplied in power. The associated electronics are small and with low consummation: a sensor with limited volume and limited power supply allow a minimum bulk. For example, sensors can be of the type MEMS. Most preferably, the sensor is auto-sufficient in terms of power supply. For example, sensors can be of the type optical sensor; when an optical signal is sent to the optical sensor, the signal reflected by said sensor informed on the measured physical parameter. For example, the sensor is a temperature sensor and/or a pressure sensor in the family of Bragg grating sensor. The major advantage is that there is no need of complex or unwieldy electronic or power supply to support the sensor. All the electronic and analyzing part is at the surface, a signal is sent from the surface to the object and to the embedded sensor, the reflected signal received at the surface is analyzed and informs on the measured physical parameter in the vicinity of the sensor on the object. For example, the object is a plug comprising an embedded Bragg grating sensor informing on the temperature of the cement function of time, thanks to the temperature profile function of time the WOC time can be measured.

According still to another aspect of the invention, the apparatus can be deployed with one or more actuators to be activated on the object.

The invention provides also a method for evaluating the loss circulation in a wellbore made of a casing and an annular with an annular fluid within, comprising the step of (i) fixing a reel of wound optic fiber line on an object, said object defining a plug in said casing; (ii) fixing the optic fiber line on a first position to a reference point; (iii) moving the object within the casing so that the optic fiber line is unwound from the reel on a second position; (iv) generating from the first position a signal along the optic fiber line; (v) measuring from the first position a change of said signal along the optic fiber line, said signal informing on the second position; (vi) deducing from said change the displacement of the object and the flow rate at the object level $Q_s$; (vii) measuring the flow rate of the fluid exiting the annular at the surface level $Q_r$; (viii) evaluating the loss circulation $Q_l$ by comparing the flow rate at the object level $Q_s$ with the flow rate at the surface level $Q_r$. Preferably, the method further comprises the step of pumping a fluid in the casing at the reference point level and measuring the flow rate of the fluid at the reference point level $Q_c$ and evaluating the U-tubing effect of the casing by comparing the flow rate at the object level $Q_s$ with the flow rate at the reference point level $Q_c$. Preferably, the method further comprises fixing means able to create the change of the signal at the second position.

In another aspect, the invention provides also a method for evaluating the U-tubing effect in a tube, comprising the step of: (i) fixing a reel of wound optic fiber line on an object, said object defining a plug in said tube; (ii) fixing the optic fiber line on a first position to a reference point; (iii) pumping a fluid in the tube at the reference point level; (iv) measuring the flow rate of the fluid at the reference point level a; (v) moving the object within the tube thanks to the fluid so that the optic fiber line is unwound from the reel on a second position; (vi) generating from the first position a signal along the optic fiber line; (vii) measuring from the first position a change of said signal along the optic fiber line, said signal informing on the second position; (viii) deducing from said change the displacement of the object and the flow rate at the object level $Q_s$; and (ix) evaluating the U-tubing effect of the tube by comparing the flow rate at the object level $Q_s$ with the flow rate at the reference point level $Q_c$. Preferably, the method further comprises fixing means able to create the change of the signal at the second position.

Still in another aspect, the invention provides a method for limiting the U-tubing effect in a wellbore made of a casing and an annular with an annular fluid within and a pump pumping a fluid in the casing at a reference point level comprising the steps of: (i) performing the evaluation of the U-tubing effect in the casing as described above; (ii) identifying the presence of the U-tubing effect in the casing; (iii) performing the evaluation of the loss circulation in the wellbore as described above; (iv) identifying the absence of the loss circulation in the wellbore; and (v) adjusting the flow rate of the fluid at the reference point level $Q_c$. The step of adjusting the flow rate of the fluid at the reference point level $Q_c$ can be done by reducing said flow rate.

Also, it is disclosed a method for limiting the loss circulation in a wellbore made of a casing and an annular with an annular fluid within and a pump pumping a fluid in the casing at a reference point level comprising the steps of: (i) performing the evaluation of the loss circulation in the wellbore as described above; (ii) identifying the presence of the loss circulation in the wellbore; and (iii) adjusting the flow rate of the fluid at the reference point level $Q_c$. The step of adjusting the flow rate of the fluid at the reference point level $Q_c$ can be done by reducing said flow rate.

BRIEF DESCRIPTION OF THE DRAWINGS

Further embodiments of the present invention can be understood with the appended drawing:

FIG. 1 shows a schematic diagram illustrating the apparatus according to the invention.

DETAILED DESCRIPTION

FIG. 1 is a view of the apparatus deployed in a wellbore 1 in a formation 32 comprising a casing 30 and an annular 31 between said casing and the formation. A plug 20 is shown moving along the casing thanks to a wellbore fluid 37 such as drilling mud that is pumped in behind the plug. This plug separates the cement from the drilling mud to minimize contamination of the cement. As the plug moves along the casing, the cement in front of the plug is displaced into the annular. After an annular fluid 33 present in the annular can be displaced up to the surface. When perfect isolation is performed cement fills the annular. As well, cement can be displaced up to the surface.

An optic fiber line 10 or fiber which is wound in a reel 40 is attached to an upper portion of the plug; practically the reel is attached or fixed through a unique point of hanging 5 which correspond to an end of the fiber or through a part of the reel. The optic fiber line used can be on any type of fiber optic, multi-mode or single mode. Preferably if needed to be cost effective, single mode optic fiber line is used. The reel can also be mounted in a housing or cartridge. The importance is that when the plug moves along the casing, the reel and the plug are interdependent, but the fiber can be unwound from the reel. On the other end of the fiber, the fiber is attached or fixed to a first position 4, or a reference point. As it is understood, the fiber is unwound from the reel thanks only to the movement of the plug at a second position 4', which correspond to a dynamic point. An upper part 10A of the fiber corresponds to the unwound fiber (between the first position and the second position) and a lower part 10B of the fiber corresponds to the wound fiber, still in the reel. The dynamic point versus the reference point or the second position versus the first position informs on the location of the plug within the well or on the displacement rate of the plug within the well.

The reel 40 of wound optic fiber line is made in such a way that the windings of the fiber ensure that the fiber can simply be unwound from the reel with a minimum tension applied on the fiber reel. The only mechanical force applied on the fiber is the drag force coming from the drilling mud flow; there is no additional tension. The windings have to consider that unwinding can be operated at low or high speed, with low or high density for the surrounding fluid. Also one important parameter to consider is the way the fiber will be unwound. The reel of wound optic fiber line is made in such a way that the windings of the fiber ensure that the deployed fiber has a known trajectory or curve. The twist or torsion of the fiber on the reel and windings are chosen accordingly. Effectively, as shown on FIG. 1, the trajectory of the fiber 10 is rectilinear or substantially rectilinear on part 10A. Trajectory, as for example an helix with known radius and vertical separation, can also be used. Trajectory can also be chosen so the fiber touches the wall of the wellbore: the radius of the helix is larger than the radius of the wellbore. Other more complex trajectory can also be chosen. Thanks to the advantageous properties of the fiber, size and weight, this trajectory will be unchanged within the wellbore, during unwinding or some times after the unwinding.

In addition to the way the fiber is wound and the winding of this last one, an additional means to fix or to stick the windings of fiber can be used: a special glue, a physical or chemical treatment of the fiber. Also, the fiber can be further treated so it is chemically resistant and able to withstand the huge abrasion of solid particles flowing at high speed within the wellbore for a certain period of time (typically 12 hours). For that purpose, fibers can be specially treated or can be packaged within a protective jacket. Additionally the reel can be associated with a housing or a dispensing cartridge which supports the winding of the fiber. The housing or the cartridge can directly be attached or fixed to the plug.

The first position 4 is located inside a cementing head 3, which is a static point. From this first position the fiber is linked to a light transmitter/receiver device 12 via a feedthrough: the low-pressure side being connected to the device 12 and the high-pressure side being connected to the optic fiber line 10. The light transmitter/receiver device is an Optical Time Domain Reflectometer (OTDR). The OTDR is an instrument that analyzes the light loss in a fiber. The working principle consists to inject a short, intense laser pulse into the fiber and to measure the backscatter and reflection of light as a function of time. The reflected light is analyzed to determine the location of any fiber optic event like splices, break or fiber end. In a simpler design often defined as Fiber Break Locator (FBL), the functionality is limited to the distance measurement of the first large optical event. Preferably, the light transmitter/receiver device 12 is a FBL.

A characteristic of the fiber is known with enough precision to calculate the length of the deployed fiber (Part 10A) or of all the length of the fiber (Parts 10A and 10B). For example index of the fiber is known, n=1.4682 for SMF28e from Corning at 1550 nm. As the plug is moving away from the cement head, the plug movement unwinds the fiber. The fiber deployed within the wellbore does not present any particularity that could substantially attenuate the propagation of the optical pulse (Part 10A). By creating an optical event at the plug level corresponding to the second position 4', the FBL will give the actual position of the plug.

In a first embodiment, the reel is made with a short diameter of winding or more precisely a diameter short enough to be detected by the FBL (critical diameter $d_c$ or critical radius $r_c$, $2 r_c = d_c$); effectively the short diameter creates an attenuation detectable by the FBL. The reel diameter is short enough to stop the propagation of the optical pulse. The reel diameter able to stop the optical pulse is a function of the pulse wavelength. The reel being seen as the first major optical event, the FBL will measure the length of the deployed fiber up to the reel, i.e. the plug. However also, the diameter of the reel can not be too short; effectively reducing the diameter of the reel can limit the maximum measurable distance to an unacceptable value.

In a second embodiment, the reel has been specially modified so the reel presents a required minimum curvature short enough to be detected by the FBL. So, the reel can have various geometric shapes; importance is that within the various curvatures present in this reel, there is a minimum curvature (close to $r_c$) which is the required curvature short enough to be detected by the FBL. For example, the shape of the reel can be ovaloid with a wanted curvature. The wanted curvature is short enough to stop the propagation of the optical pulse. The wanted curvature able to stop the optical pulse is a function of the pulse wavelength.

In a third embodiment, the reel is made with a diameter not necessarily short even large, unable to stop the optical pulse and use the method as described above. In this case an additional element (not shown on the FIGURE) is added on the second position 4'. The additional element corresponds to mechanical path through which the fiber is unwound and bends at a radius short enough to stop the optical pulse. In fact, the additional element creates the optical event. The additional element can be simply an angled tube or an angled collar through which the fiber passes. The radius able to stop the optical pulse is a function of the pulse wavelength. All these advantageous embodiments ensure that the major optical event is located at the second position and is detected more precisely.

In a fourth embodiment, the fiber is coiled like in the second embodiment at a constant and large radius R, which is greater than the critical radius $r_c$ but with a truncation T greater than 1 (truncation of 1 corresponds to joint turns). As a consequence, even and odd fiber layers are netted and an optical event is created at each crossing of fiber turns belonging to successive layers. The fiber diameter being small compared to the coiling diameter, it can be easily established that the fiber bend radius created by the crossing of two fibers is an inverse function of the coil truncation T that can take any integer value greater than zero: $r_{crossing} = R/T$. For instance a 30 mm spool diameter with a truncation of 3 has the same optical response than a 10 mm radius spool coiled with the first embodiment. Like for the second embodiment, optical events are evenly distributed along the fiber. The distribution period being smaller than the length resolution of the OTDR, the spool manufacturing process does not alter the measurement resolution.

The key advantage of the reel fixed to the plug is the possibility to perform this analysis from a single fiber end: the measurement is performed from the surface without any costly downhole equipment that would be destroyed when drilling operations resume once the cement is set.

As said above, the winding of the fiber ensures that the deployed fiber (part 10A) has a known trajectory or curve and the FBL measures the length of the deployed fiber up to the plug. Therefore, a speed or an acceleration of the plug can be determined function of time or function of depth. For example, when the trajectory is rectilinear, there is a direct correlation between length of the deployed fiber from the surface to the plug and depth of the plug from the surface to the plug. When the trajectory is a helix or more complex curve, there is a link between length of the deployed fiber from the surface to the plug and depth of the plug from the surface to the plug, the displacement of the plug can be given. For example for a helix of axis z, it will be $$l = z \cdot \sqrt{\left(\frac{2\pi \cdot r}{p}\right)^2 + 1},$$

where l is the length of the deployed fiber, z the depth or axial position, r is the radius of the helix and p is a constant giving the vertical separation of the helix's loops. In the same way, depth can be defined. The key advantage of this technique is the possibility to obtain the actual position or depth of the plug.

Also, the inner diameter of the casing D is known and substantially equal all along the casing. Therefore, a flow rate can be measured thanks to speed of the plug, the flow rate at the plug level (or flow rate at the shoe level) $Q_s$ will be: $Q_s$=D.v, where v is the speed of the plug. The flow rate of the fluid pumped at the surface into the casing is known as well $Q_c$. Normally, without U-tubing effect both flow rates are continuously equal $Q_s$=$Q_c$, therefore by comparing both flow rate values it is possible to estimate the U-tubing effect:

$Q_s \geqq Q_c$ will inform of an increasing vacuum length inside the casing, $Q_s \leqq Q_c$ will inform of the gradual refilling of the casing.

U-tubing effect can also be detected easily and conventionally by measuring the surface pressure during the cement job. This method can be combined with the other one or used alternatively. Additionally, during period where there is no U-tubing effect, flow rate at the shoe can also be compared to the pump rate to estimate the pump efficiency in actual pressure and temperature condition.

The apparatus of the invention comprises further a system 35 able to measure the flow rate of the annular fluid 33 exiting at the surface level $Q_r$. As already described, the flow rate at the plug level $Q_s$ can be measured and if $Q_l$ is the flow rate corresponding to the loss circulation into the formation, the following equation is verified: $Q_s$=$Q_r$+$Q_l$. Therefore estimation of the flow rate pertaining to loss circulation can be done with: $Q_l$=$Q_s$−$Q_r$. If in the annular there is no leak of fluid into the formation, the flow rate at the shoe is the return flow at the surface.

The system 35 can be a mechanical flow meter, or a flow meter with flow rate incorporate electronic devices. Preferably, the system is incorporated within conventional surface equipment. For example, the system comprises further a tub or pit and a pump for mud exiting the pit, wherein flow rate can further be measured by $Q_r$=$Q_{mudpit}$+$Q_{tub}$. Both flow rate values $Q_{mudpit}$ and $Q_{tub}$ are commonly measured or estimated in cement jobs.

Additionally, the apparatus of the invention can be deployed with one or more sensors informing on property of the environment surrounding the plug, as for example the cement. The reel comprises an end of the fiber which is linked to a sensor located on the plug. The sensor can be or not in contact with the cement. On the other end of the fiber, the fiber is attached or fixed to a first position, or a reference which correspond here also to a static point. As it is understood, the fiber is unwound from the reel thanks to the movement of the plug at a second position, which correspond to a dynamic point. An upper part of the fiber corresponds to the unwound fiber (between the first position and the second position) and a lower part of the fiber corresponds to the wound fiber, still in the reel.

By way of example, to obtain information from the sensor, on the first position, at least two signals, each made of a different wavelength, are injected into the fiber. The longest wavelength is attenuated by the first major optical event created by any of the techniques described above (short reel diameter, curvature of the reel, additional element creating bend or curvature). While, the shortest wavelength propagates up to the end of the fiber. The travel time on the long wavelength gives the measurement of the length of the deployed fiber to the plug while the shortest one can access to the sensor embedded within the plug. Embedded sensors within the plug would give the possibility to monitor the measured parameters during displacement and during wait on cement (WOC). More precisely, the parameter to measure during these well cementing phases is the temperature. During movement of the plug, it would be a convenient way to assess temperature simulations. During WOC, it would detect the temperature increase due to the exothermal reaction of setting cement.

The sensor can be an optical sensor of the type Bragg grating sensor. The Bragg grating sensors are realized by modulating the refraction index of an optical fiber line around its nominal value. They act as selective reflectors for the Bragg wavelength $\lambda_B$ defined by the following relationship: $\lambda_B$=2.n.Λ; where n is the refraction index of the fiber and Λ the wavelength of the index modulation. Λ being a linear function of temperature, measuring the Bragg wavelength $\lambda_B$ is a convenient way to measure the Bragg grating temperature typically at 1 degree Celsius. The key advantage of this technique is the fact that the measurement is remotely performed at the fiber end located at the surface (first position). Nothing else than the Bragg grating sensor is required at the plug level where the temperature measurement is performed.

Many other physical parameters are measurable using a miniaturized sensor self supplied in power. The associated electronics are small and with low consummation: a sensor with limited volume and limited power supply allow a minimum bulk. For example, sensors can be of the type MEMS. The sensor can also be auto-sufficient in terms of power supply, as for example an optical sensor: there is no need of conventional and costly packaging including electronics, powers supply and analyzing devices. For instance, Bragg gratings sensors can also be used for pressure measurement.

In another embodiment, multiple optical sensors may be arranged in a network or array configuration with individual sensors multiplexed using time division multiplexing or frequency division multiplexing, those sensors can be deployed within the plug or also along the fiber. Even, when Bragg grating sensors are used there is no need of using multiplexing; multiple Bragg grating sensors are arranged in network in series, each Bragg grating sensor having its wavelength and being interrogated by the light transmitter/receiver. Aim of deploying sensors along the fiber can provide a profile of measurement in the wellbore. Also, the network of sensors may provide an increased spatial resolution of temperature, pressure, strain, or flow data in the wellbore.

Other applications of the apparatus and the method according to the invention include fixing the first position on any of static or dynamic point, for example in subsea or downhole operations.

In another aspect, the fiber may be used to transmit signals to a downhole apparatus to effect the operation thereof as an operator or an actuator. In one embodiment, an optic fiber line may be disposed along the wellbore. Thereafter, signals may be transmitted through the fiber to operate a valve or to activate a sleeve for example. From the surface, at least two signals, each made of a different wavelength, are injected into the fiber. The longest wavelength is reflected by the first major optical event created by any of the techniques described above (bend made with the reel or bend made with an additional element). While, the shortest wavelength propagates up to the end of the fiber. The travel time on the long wavelength gives the measurement of the plug position while the shortest one can access to the actuator within the plug. The actuator can be self sufficient, actuating only by the wavelength or can further be connected to electronics and power supply ensuring to perform this action.

The invention claimed is:

1. A method for evaluating the loss circulation in a wellbore made of a casing and an annular with an annular fluid within, comprising:
   (i) fixing a reel of wound optic fiber line on an objet, said object defining a plug in said casing;
   (ii) fixing the optic line on a first position to a reference point;
   (iii) moving the object within the casing so that the optic fiber line is unwound from the reel on a second position;
   (iv) generating from the first position a signal along the optic fiber line;
   (v) measuring from the first position a change of said signal along the optic fiber line, said signal informing on the second position;
   (vi) deducing from said change of said signal a displacement of the object and a flow rate at an object level $Q_s$;
   (vii) measuring the flow rate of the fluid exiting the annular at the surface level $Q_r$;
   (viii) evaluating the loss circulation $Q_l$ by comparing the flow rate at the object level $Q_s$ with the flow rate at the surface level $Q_r$.

2. The method of claim 1, further comprising the step of pumping a fluid in the casing at the reference point level and measuring a flow rate of the fluid at a reference point level $Q_c$ and evaluating a U-tube effect of the casing by comparing the flow rate at the object level $Q_s$ with the flow rate at the reference point level $Q_c$.

3. The method of claim 1, further comprising fixing means at the second position that is able to create the change of said signal.

4. A method for limiting the loss circulation in a wellbore made of a casing and an annular with an annular fluid within and a pump pumping a fluid in the casing at a reference point level comprising:
   (i) performing the evaluation of the loss circulation in the wellbore according to claim 1;
   (ii) identifying the presence of the loss circulation in the wellbore; and
   (iii) adjusting the flow rate of the fluid at the reference point level $Q_c$.

5. The method of claim 1, wherein the flow rate at the object level $Q_s$ is measured by the displacement of the object within the casing by unwinding from the reel.

6. The method of claim 1, wherein the object is made of a dart or a plug or a foam ball.

7. A method for evaluating the U-tubing effect in a tube, comprising:
   (i) fixing a reel of wound optic fiber line on an object, said object defining a plug in said tube;
   (ii) fixing the optic fiber line on a first position to a reference point;
   (iii) pumping a fluid in the tube at the reference point level;
   (iv) measuring the flow rate of the fluid at the reference point level $Q_c$;
   (v) moving the object within the tube thanks to the fluid so that the optic fiber line is unwound from the reel on a second position;
   (vi) generating from the first position a signal along the optic fiber line;
   (vii) measuring from the first position a change of said signal along the optic fiber line, said signal informing on the second position;
   (viii) deducing from said change of said signal a displacement of the object and a flow rate at an object level $Q_s$;
   (ix) evaluating the U-tubing effect of the tube by comparing the flow rate at the object level $Q_s$ with the flow rate at the reference point $Q_c$.

8. The method of claim 7, further comprising fixing means at the second position that is able to create the change of said signal.

9. A method for limiting the U-tubing effect in a wellbore made of a casing and an annular with an annular fluid within and a pump pumping a fluid in the casing at a reference point level comprising:
   (i) performing the evaluation of the U-tubing effect in the casing according to claim 7;
   (ii) identifying the presence of the U-tubing effect in the casing;
   (iii) performing an evaluation of loss circulation in the wellbore;
   (iv) identifying an absence of the loss circulation in the wellbore;
   (v) and adjusting the flow rate of the fluid at the reference point level $Q_c$.

10. The method of claim 7, wherein the flow rate at the object level $Q_s$ is measured by the displacement of the object within the casing by unwinding from the reel.

11. The method of claim 7, wherein the object is made of a dart or a plug or a foam ball.

12. An apparatus for use in a wellbore made of a casing and an annular with a fluid within, comprising:
    a reel of wound optic fiber line fixed to an object within the casing, and
    a light transmitter/receiver device able to generate a signal through the optic fiber line and to measure a change of said signal;
    wherein the optic fiber line is: (a) on a first position fixed to a reference point linked to the light transmitter/receiver device, and is (b) on a second position unwound from the reel;
    wherein the light transmitter/receiver device is able to measure the change of said signal when occurring at the second position; and the apparatus being characterized by having a system able to measure a flow rate of the fluid exiting the annular at a surface level $Q_r$:
    wherein the apparatus further comprises an input of fluid in the casing at the surface and a flow meter able to measure the flow rate of said fluid at the reference point level $Q_c$:
    wherein a flow rate at an object level $Q_s$ is measured by the displacement of the object within the casing by unwinding from the reel.

13. The apparatus according to claim 12, further comprising an additional element on the second position able to create the change of said signal at the second position.

14. The apparatus according to claim 12, wherein the light transmitter/receive device is an apparatus in the family of optical time domain reflectometer.

15. The apparatus according to claim 12, wherein the object is made of a dart or a plug or a foam ball.

16. The apparatus according to claim 12, wherein the optic fiber line is further linked to a sensor.

17. The apparatus of claim 16, wherein the sensor is a sensor in the family of Bragg grating sensor.

18. The apparatus according to claim 12, wherein the optic fiber line is further linked to an actuator located on the object.

* * * * *